United States Patent
Walmsley et al.

(10) Patent No.: US 6,882,019 B2
(45) Date of Patent: Apr. 19, 2005

(54) MOVABLE MICRO-ELECTROMECHANICAL DEVICE

(75) Inventors: Robert G Walmsley, Palo Alto, CA (US); Donald J Milligan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 10/157,254

(22) Filed: May 28, 2002

(65) Prior Publication Data

US 2003/0222430 A1 Dec. 4, 2003

(51) Int. Cl.⁷ .............................. H01L 29/84
(52) U.S. Cl. ................. 257/415; 257/415; 257/417
(58) Field of Search ............... 257/415, 417, 257/418, 419, 420, 421, 414

(56) References Cited

U.S. PATENT DOCUMENTS 5,557,596 A * 9/1996 Gibson et al. .............. 369/101
5,834,864 A * 11/1998 Hesterman et al. ... 310/40 MM
2002/0122373 A1    9/2002 Marshall

FOREIGN PATENT DOCUMENTS

| EP | 0 734 017 | 9/1996 |
|----|-----------|--------|
| EP | 0 763 881 | 3/1997 |
| EP | 1 239 580 | 9/2002 |
| EP | 1 251 503 | 10/2002 |

* cited by examiner

*Primary Examiner*—David Nelms
*Assistant Examiner*—Thinh T Nguyen (57) ABSTRACT

A movable system, such as a computer storage device, having a frame, a mover configured to move relative to the frame, and a mechanical suspension operatively coupled between the frame and mover. The mechanical suspension is configured to permit planar movement of the mover while substantially preventing out-of-plane movement, and includes a first flexure configured to flex in response to movement of the mover in a first direction relative to the frame, and a second flexure configured to flex in response to relative movement occurring in a second direction.

11 Claims, 8 Drawing Sheets

MOVABLE MICRO-ELECTROMECHANICAL DEVICE

BACKGROUND OF THE INVENTION

Micro-electromechanical (MEMS) devices having components configured to move relative to one another are widely known. An example of such a movable system is a computer storage device having a frame, mover, and a mechanical suspension interconnecting the frame and mover. Typically, the mechanical suspension holds the mover relative to the frame and allows for relative movement to occur between the mover and frame. Relative movement is achieved by applying a force to the frame and/or mover. In many cases, the applied force is provided by an actuator, such as an electrostatic drive located on the frame. The mechanical suspension typically includes flexing structures, referred to as flexures, that have spring-like characteristics. When an actuating force is applied, the mover is displaced relative to the frame from a resting or equilibrium position. When the actuating force is removed, the flexures urge the mover to return to the resting position. In data storage applications, the mover is often provided with a number of data storage locations that are accessible via operation of a read/write device located on the frame. Accessing a particular storage location may be accomplished by displacing the mover relative to the frame in a controlled manner via operation of an electrostatic drive. Effective operation of the storage device depends on the ability to precisely control and monitor the relative motion occurring between the frame and mover. In many cases, the configuration of the mechanical suspension greatly affects the ability to precisely control and monitor this relative motion.

Accordingly, it is often desirable to constrain relative motion so that the moving components are restricted from moving in a particular direction or directions. For example, the system may be configured to permit relative motion to occur only along one axis. In the data storage setting discussed above, the suspension typically permits the mover to move within a plane (e.g., the X-Y plane), but prevents it from moving in an out-of-plane direction (along the Z-axis). Constraining these devices to planar motion is often achieved by the flexures discussed above so that they flex only in certain directions. Such flexures are often described in terms of their stiffness (resistance to flexing) in a given direction. For example, a flexure system configured to allow X-Y planar motion while preventing Z-axis out-of-plane motion would be referred to as having a relatively low X-Y stiffness and a relatively high Z-axis stiffness.

Existing computer storage and other MEMS devices have various problems and limitations associated with the mechanical suspension used to interconnect the movable components. Most planar-type computer storage devices allow some amount of out-of-plane movement to occur. In terms of stiffness, such a device would be described as having a relatively high, but not infinite, Z-axis stiffness (out-of-plane stiffness). One shortcoming of many MEMS computer storage devices is that the out-of-plane stiffness varies significantly with displacement of the mover relative to the frame. Specifically, out-of-plane stiffness tends to decrease substantially in these devices the further the mover is displaced from the resting position. The wide variation in out-of-plane stiffness can significantly complicate the design of the device, since it typically is desirable to compensate for stiffness variations. Variations in in-plane stiffness is another shortcoming of many existing devices. In particular, for many MEMS devices, the in-plane stiffness of the mechanical suspension increases substantially the further the mover is displaced from the resting position. Consequently, as the mover is displaced further from the resting position, the actuator must apply a greater force to produce the same relative change in displacement. As with the previously described problem, the position-dependent behavior of the mechanical suspension can significantly complicate the design of the MEMS device and related systems.

SUMMARY OF THE INVENTION

A movable system, such as a computer storage device, is provided including a frame, a mover configured to move relative to the frame, and a mechanical suspension operatively coupled between the frame and mover. The mechanical suspension typically is configured to permit planar movement of the mover while substantially preventing out-of-plane movement, and typically includes a first flexure configured to flex in response to movement of the mover in a first direction relative to the frame, and a second flexure configured to flex in response to relative movement occurring in a second direction.

DETAILED DESCRIPTION OF THE PREFERRED EMBODIMENT

The present embodiments of the invention are directed to micro-electromechanical (MEMS) devices and other movable systems having an improved mechanical suspension configured to interconnect system components that move relative to one another. The movable systems described herein may be used in a variety of settings, but have proven particularly useful in very small computer storage devices. For purposes of illustration only, the movable system embodiments described below will be discussed primarily in the context of a high-density MEMS computer storage device.

Figure 1:
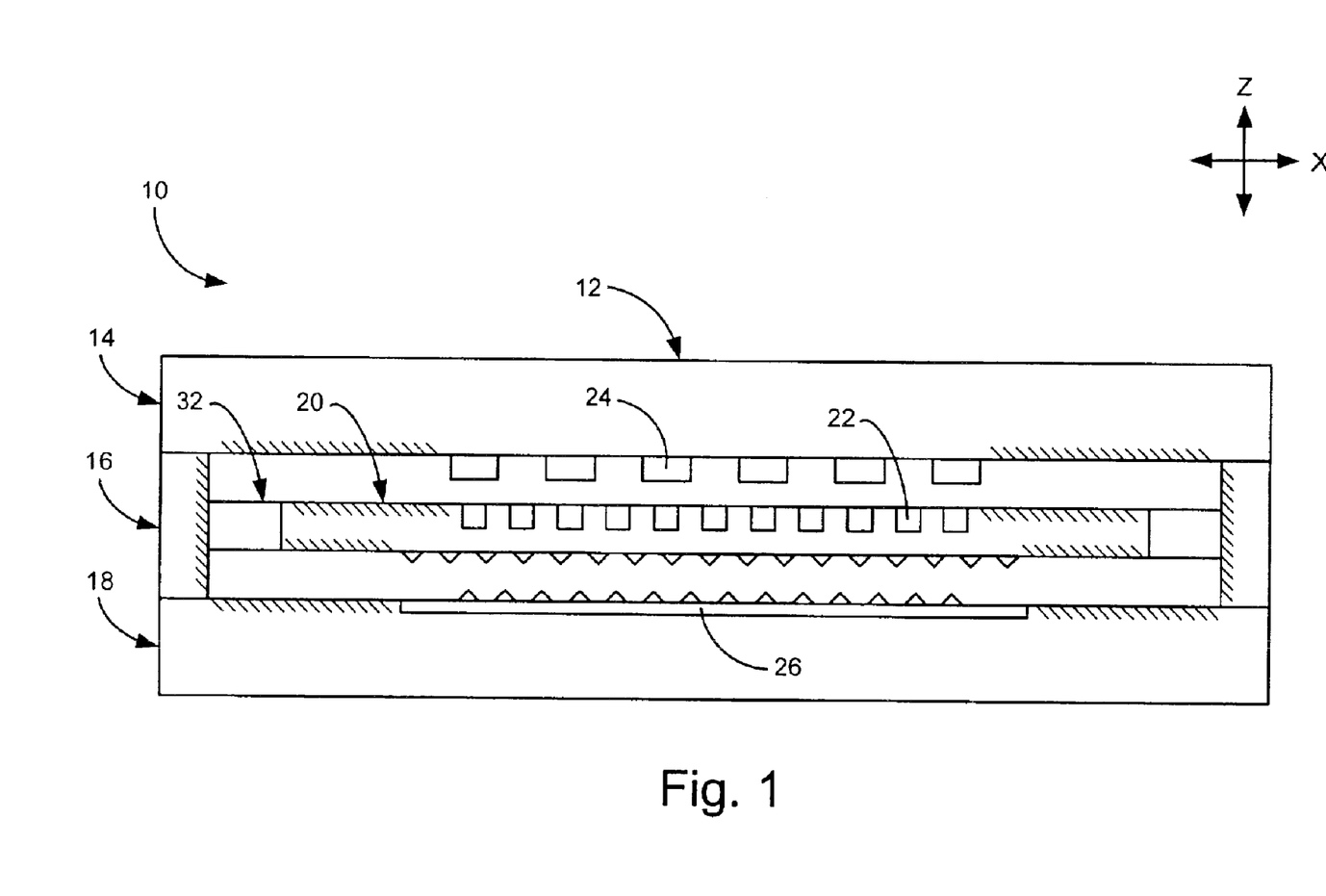
FIG. 1 is a schematic side view of a movable system, according to one embodiment of the present invention.

FIG. 1 shows a side cross-section view of a computer storage device 10, including a mechanical suspension. Device 10 typically is composed of a semiconductor material and may be formed using various fabrication techniques, including silicon wafer bonding and deep reactive ion etching. Device 10 includes a frame 12 having a top layer 14, middle layer 16, and bottom layer 18. Middle layer 16, also referred to as the mover layer, is connected to a mover 20, which is mechanically suspended between top layer 14 and bottom layer 18. Layers 14, 16 and 18 typically are planar and arranged parallel to one another.

Mover 20 may be provided with a plurality of data storage locations accessible through operation of a read/write device or like device secured to frame 12. Mover 20 typically is configured to move relative to frame 12 so that data may be written to and read from specific storage locations. Referring specifically now to the figure, mover 20 may include one or more data storage locations 22. Data may be read from and written to storage locations 22 using read/write heads 24, or emitters, secured to top layer 14 of frame 12. Accessing a specific storage location typically involves displacing mover 20 in the X and/or Y directions from a resting position, relative to frame 12. For purposes of illustration and clarity only, FIG. 1 and various other figures to be described include rectilinear coordinate axes. These axes are arbitrary, and it should be understood that the systems described herein may be described in terms of any other frame of reference.

Device 10 typically also includes an actuator, such as electrostatic drive 26, to generate forces which produce relative movement between frame 12 and mover 20. These forces may be generated via application of voltages to electrodes located on frame 12 and/or mover 20. The applied voltages create forces of attraction and/or repulsion between frame 12 and mover 20. Typically, these forces include X and Y components, so as to cause relative movement to occur in the X-Y plane, though in many cases, the drive will also produce forces having a Z-axis component. To allow X-Y planar motion while substantially preventing Z-axis motion, it will often be desirable to configure the suspension to have a relatively low in-plane stiffness (e.g., in the X-Y plane), and a relatively high out-of-plane stiffness (e.g., along the Z axis).

An example of such a mechanical suspension is shown in FIG. 1 at 32. Suspension 32 is provided to hold mover 20 in its planar orientation relative to layers 14 and 18 (e.g., parallel to the X-Y plane), and to connect mover 20 to frame 12. Suspension 32 typically includes one or more spring-like structures, as will be described in detail below. As will be explained, these structures typically are configured to allow planar displacement of mover 20 from a resting position while substantially limiting out-of-plane movement of mover 20 relative to frame 12.

Figure 2:
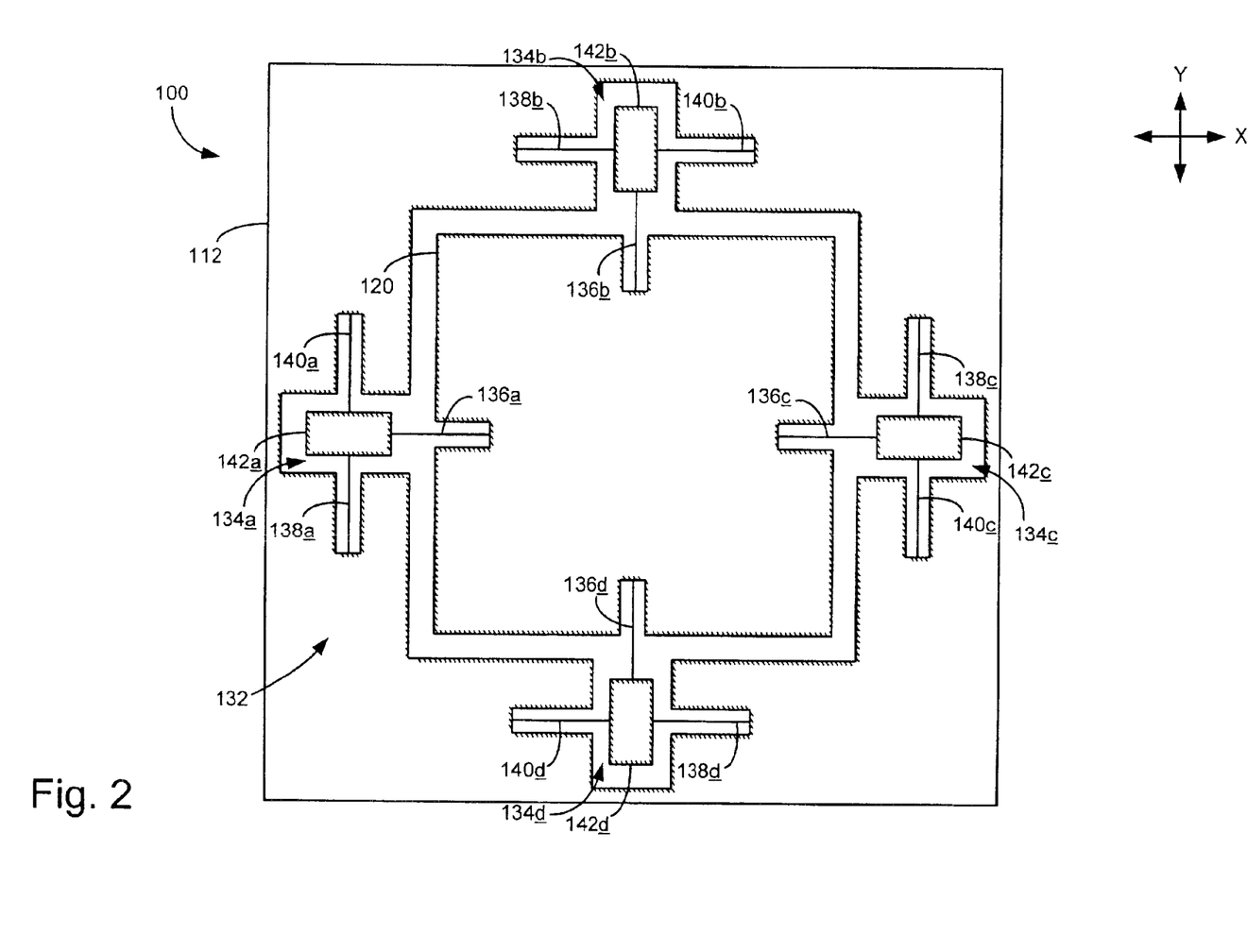
FIG. 2 is a schematic plan view of a movable system, according to one embodiment of the present invention.

FIG. 2 depicts a storage device 100, including a mechanical suspension 132 interconnecting frame 112 and mover 120. Suspension 132 typically includes a plurality of suspension sub-assemblies, or units 134 (individually designated as 134a, 134b, 134c and 134d), that are arrayed about mover 120 to suspend the mover relative to the frame. Typically, frame 112 and mover 120 are substantially planar and are configured such that mover 120 has an operative range of planar X-Y motion within frame 112. Mover 120 may be displaced relative to frame 112 using an electrostatic drive, as described above, or through operation of any other suitable actuating mechanism. As indicated, it will often be desirable to provide suspension assembly 132 with four suspension units arranged symmetrically about frame 120 and operatively disposed between the frame and mover 120. Alternatively, there may be one, two, or three suspension units, or more than four suspension units, as desired and appropriate for a given application.

As seen in FIG. 2, suspension unit 134a typically includes flexures 136a, 138a, and 140a, with the other suspension units having corresponding similar flexures. As used herein, "flexure" refers to any spring-like structure connecting mover 120 to frame 112, that flexes in response to relative movement between the mover and frame. Typically, the flexures have a relatively low in-plane stiffness (thus permitting planar X-Y motion) and a relatively high out-of-plane stiffness (thus substantially preventing out-of-plane Z-axis motion). In the absence of X-Y forces, the flexures typically are configured to urge mover 120 into a resting, or equilibrium position. The flexing, or resilient deformation of the flexures, will be described in more detail with respects to FIGS. 3A, 3B and 3C. In many cases, it will be desirable to form the flexures integrally with the other components of device 100, using deep reactive ion-etching or other fabrication techniques. Alternatively, the flexures may be formed separately and then secured to the mover and frame. In FIG. 2 and several of the other figures discussed herein, the flexures are depicted as lines for the sake of clarity, though it should be understood that the flexures have a non-zero thickness. The dimensions of the flexures will be described below in more detail with respect to FIG. 4.

As indicated, flexures 136a, 136b, 136c and 136d are respectively coupled between mover 120 and coupling members 142a 142b, 142c and 142d. Because these flexures are connected directly to mover 120, they will be at times referred to as "mover flexures." The remaining flexures (138a, 140a, 138b, 140b, 138c, 140c, 138d and 140d) are respectively coupled between frame 112 and coupling members 142a 142b, 142c and 142d. Because they connect frame 112 to a coupling member, these remaining flexures will at times be referred to as "frame flexures".

The various flexures may be further distinguished in terms of their response to applied forces and the resulting relative movement between the mover and frame. In particular, flexures that flex in response to X-axis movement may be considered X-axis flexures, or simply X flexures. Similarly, flexures that flex in response to Y-axis movement may be considered Y-axis flexures.

Figure 3A:
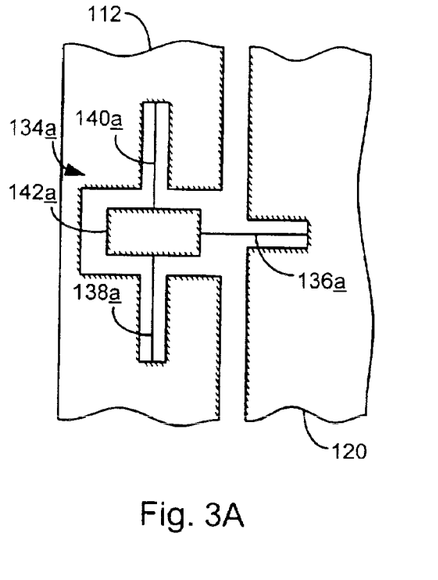
FIGS. 3A, 3B and 3C are partial schematic views of the movable system of FIG. 1, showing the suspension assembly first in a resting position (FIG. 3A), and then displaced from the resting position in X (FIG. 3B) and Y (FIG. 3C) directions.
Figure 3B:
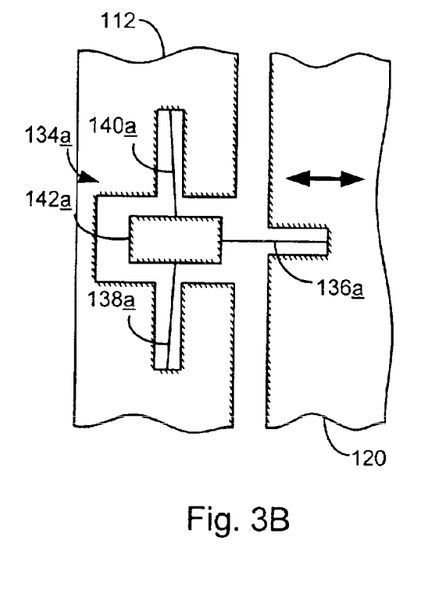
Figure 3C:
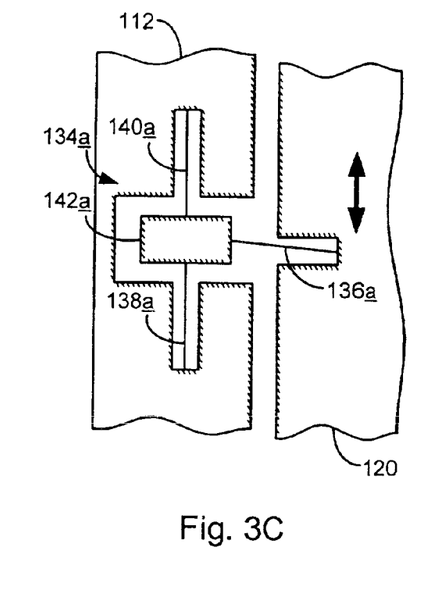

This may be seen most clearly with respect to FIGS. 3A, 3B and 3C, which depict the behavior of suspension unit 134a in response to various relative positions occurring between mover 120 and frame 112. In FIG. 3A, mover 120 is in the equilibrium position, and the flexures of suspension unit 134a are thus in an unflexed, or undeformed state. FIG. 3B depicts relative X-axis displacement occurring between the frame and mover in response to application of a force having an X-axis component. As indicated, flexures 138a and 140a are deformed, while flexure 136a remains in an undeformed state because the applied force has no Y-axis component. It will thus be appreciated that flexures 138a and 140a are acting as X-axis flexures. FIG. 3C depicts mover 120 displaced in the Y direction from the resting position, due to application of a force having a Y-axis component. The X-axis flexures 138a and 140a remain undeformed (because the applied force does not have an X-axis component), while flexure 136a is resiliently deformed. It will thus be appreciated that flexure 136a is acting as a Y-axis flexure.

Referring back to FIG. 2, it should appreciated that the suspension units 134a–d are arranged symmetrically about mover 120 such that half of the mover flexures and half of the frame flexures resiliently deform in response to displacement of the mover in the X direction, while the remaining flexures deform in response to displacement of the mover in the Y direction. This configuration provides substantial similarity in the aggregate flexural stiffness of the suspension along the X and Y axes. Such configurations, in which equal or approximately equal numbers of X and Y flexures flex, may be employed in any of the embodiments of the invention. For example, such a configuration will be described with respect to the exemplary systems in FIGS. 6B, 7B, and 8B.

Figure 4:
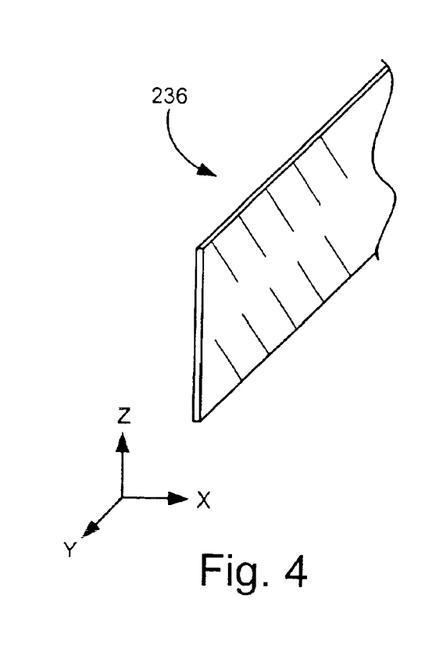
FIG. 4 is a partial isometric view of a flexure that may be employed with the movable systems.

FIG. 4 is a partial perspective view of an exemplary flexure that may be employed with the systems described herein. As indicated, flexure 236 typically is formed as a rectangularly-shaped beam, having a height that is substantially greater than its width, where height is measured along the Z axis and width is measured along the X axis. The length of flexure 236 can be varied based on the relative dimensions of the frame and mover to which it is attached, and/or as desired for a particular application. Generally, however, it will be desirable that the height be substantially greater than the width, so as to provide a Z-axis stiffness (out-of-plane stiffness) that is high relative to the X-Y stiffness (in-plane stiffness). As a result, the flexure structures flex in response to in-plane forces (thus permitting the desired planar movements shown in FIGS. 3A, 3B and 3C), while remaining substantially undeformed in response to out-of-plane forces (thus substantially preventing the undesired out-of-plane Z-axis motion).

Figure 5A:
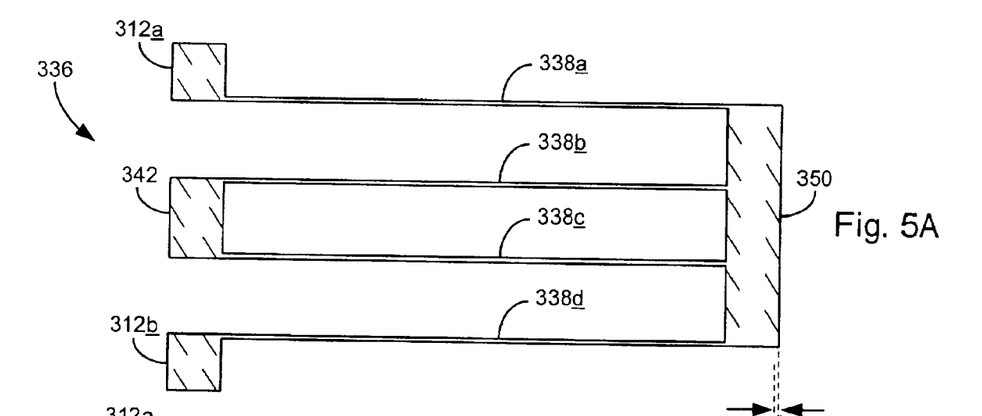
FIG. 5A is a plan view of a double-folded flexure configuration that may be employed with movable systems.
Figure 5B:
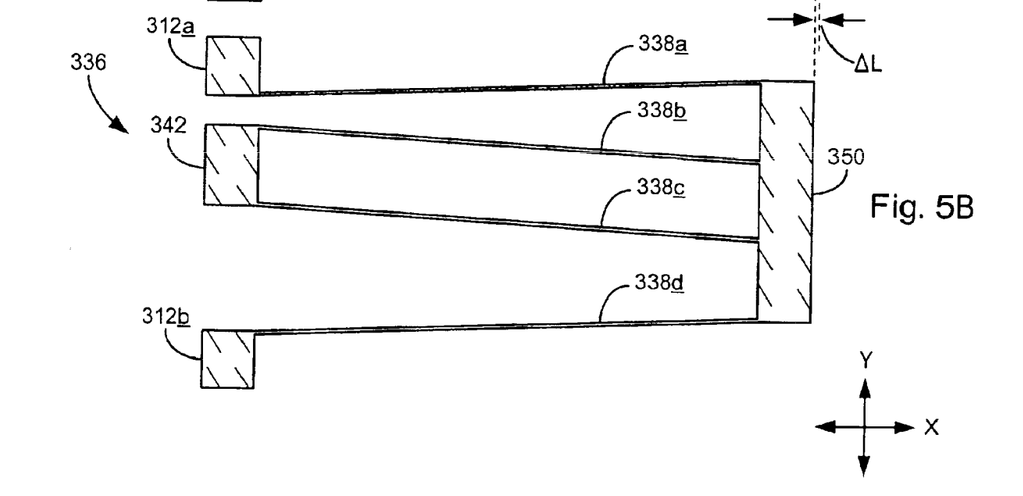
FIG. 5B is a plan view of the double-folded flexure configuration of FIG. 5A, shown displaced in the Y direction relative to a resting position.

FIGS. 1–4 primarily describe the use of a single flexure structure at a given location. For example, as discussed with respect to FIG. 2, a single flexure 136a is connected between coupling member 142a and mover 120. It should be appreciated, however, that it will often be desirable to employ multiple flexures. FIGS. 5, 6A, 6B, 7A, 7B, 8A, 8B and 9 depict examples of such multi-flexure configurations. Those embodiments will be discussed in detail below FIGS. 5A and 5B depict an example of a multiple flexure arrangement that may be employed in the mechanical suspensions of the present embodiment of the invention. The depicted arrangement is referred to as a double-folded flexure configuration. As indicated, double-folded configuration 336 typically includes four flexures 338a–d, arranged parallel and adjacent to one another. Outer flexures 338a and 338d are secured to a floating link 350 and respectively to frame anchor points 312a and 312b. Floating link 350 is typically rectangular in shape and arranged substantially perpendicular to flexures 338a–d. Inner flexures 338b and 338c are secured to floating link 350 and a coupling member (partially shown at 342).

FIGS. 5A and 5B show effective flexure shortening (axial shortening occurring along the X axis) for a relatively large Y-axis displacement occurring between the mover and frame. Specifically, FIG. 5A shows the double-folded configuration in an undeformed resting state. FIG. 5B shows the configuration in a deformed state resulting from a Y-axis displacement of the mover (not shown) and coupling member 342. As indicated, the flexure configuration is shortened axially (in the X direction) by an amount ΔL for the Y-axis displacement shown in FIG. 5B. This effective shortening of the flexures reduces the axial tensioning that would otherwise occur in flexures 338a–d. This, in turn, ensures that the in-plane stiffness of the suspension will remain more nearly uniform over the operative range of motion. The variation of the effective flexure length in order to preserve the desired stiffness characteristics may be referred to as length change compensation.

Figures 6A, 6B:
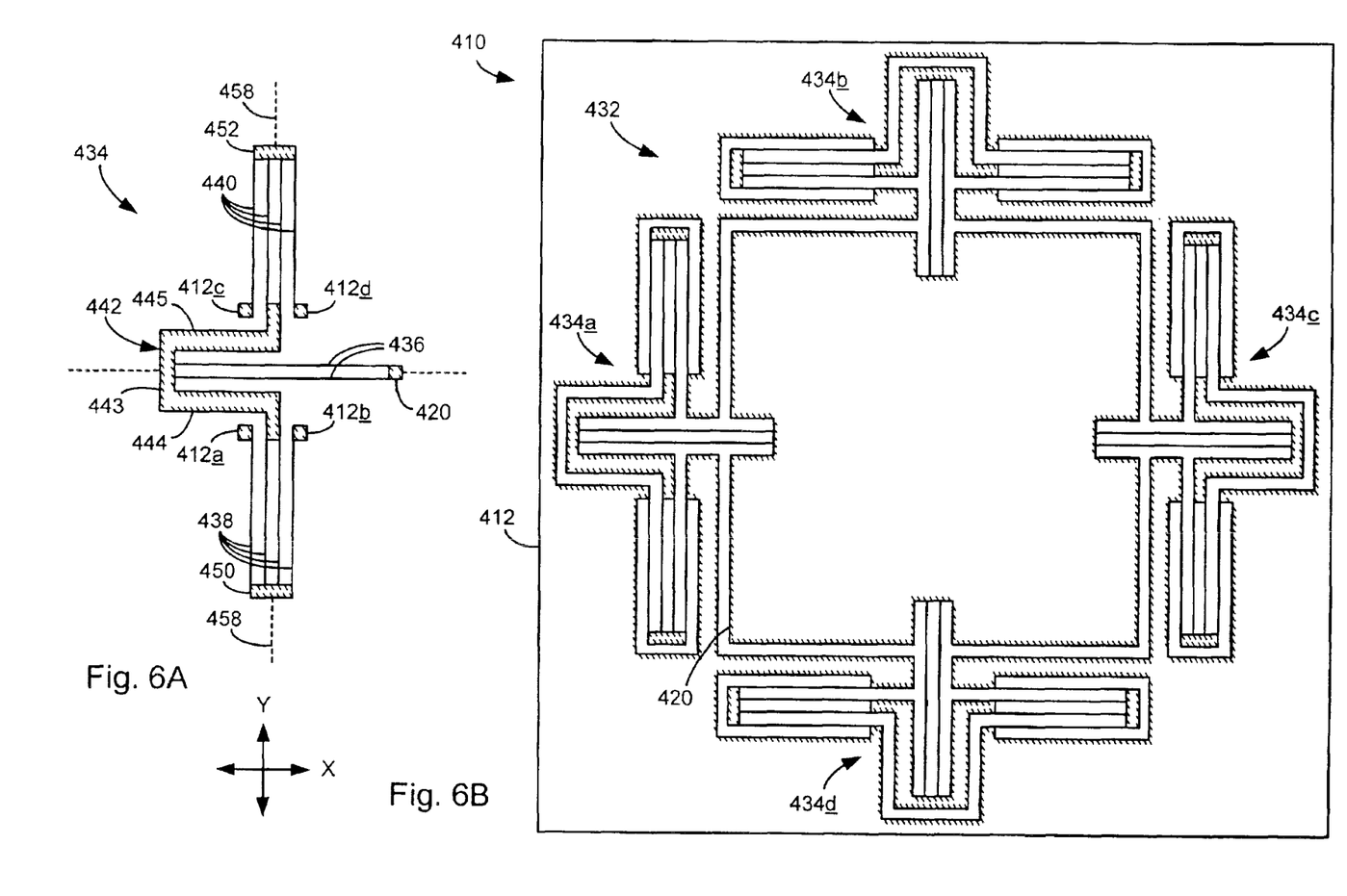
FIG. 6A is a plan view of a mechanical suspension unit that may be employed with movable systems.
FIG. 6B is a plan view of a movable system, including a plurality of suspension units such as that shown in 6A, according to one embodiment of the present invention.

FIGS. 6A and 6B respectively depict a mechanical suspension sub-assembly and a movable system (e.g., a MEMS computer storage device) incorporating a plurality of suspension sub-assemblies similar to that shown in FIG. 6A. Referring first to FIG. 6A, suspension sub-assembly 434 may include three groups of flexures 436, 438, and 440 arranged about a coupling member 442. Mover flexures 436 typically are connected between the mover (shown partially at 420) and coupling member 442, with each flexure being arranged parallel and adjacent to one another. Though two mover flexures 436 are depicted, it will be appreciated that one flexure or three or more flexures may be employed as desired.

Coupling member 442 includes a central portion 443, to which mover flexures 436 may be attached, and two side portions 444 and 445. Side portions 444 and 445 typically are parallel and opposed to one another, and perpendicular to central portion 443, such that coupling member 442 forms a "U" shaped structure. Alternatively, coupling member 442 may be trapezoidal, square or rectangular in shape, or formed with any other desired shape and/or dimensions.

As indicated, frame flexure groups 438 and 440 may be implemented with a double-folded configuration. Alternatively, the frame flexures may be implemented in other multi-flexure configurations, or as single-flexure structures, as suitable for a given application. In the depicted double-folded arrangement, a subset of frame flexures 438 are secured between coupling member 442 and a floating link 450, while the remaining frame flexures 438 are secured between floating link 450 and frame anchor points 412a and 412b. Flexure group 440 is similarly configured with respect to floating link 452 and frame anchor points 412c and 412d.

The two double-folded frame flexure groups shown in FIG. 6A typically are positioned so that the individual flexures are aligned along a common axis 458 that passes through the midpoint of (bisects) mover flexures 436. In addition, the frame flexure groups are symmetrically disposed about mover flexures 436 on opposing sides of the mover flexures. The relative arrangement of frame flexures 438 and 440, coupling member 442 and mover flexures 436 substantially limits flexural torsion when forces are applied having Z-axis (out-of-plane) components.

Referring still to FIG. 6A, displacement of mover 420 in the X direction causes mover flexures 436 to exert a force on coupling member 442, which causes X-axis displacement of coupling member 442. This, in turn, causes resilient deformation of frame flexures 438 and 440. As described above, position-dependent variation in out-of-plane stiffness is minimized through use of the double folded configuration for frame flexures 438 and 440. Displacement of mover 420 in the Y direction results mostly in flexion of mover flexures 436, and produces little or no movement of coupling member 442 and the other components of suspension sub-assembly 434.

Referring now to FIG. 6B, a MEMS device 410 is depicted, including a mechanical suspension 432 having a plurality of suspension sub-assemblies 434a–d that are similar to the sub-assembly depicted in FIG. 6A. The suspension sub-assemblies movably interconnect frame 412 and mover 420, so as to allow planar X-Y motion of the mover while substantially inhibiting out-of-plane movement (Z-axis motion). As indicated, the depicted device has four suspension sub-assemblies, with each sub-assembly being positioned at approximately the midpoint of one of the four side edges of mover 420. The depicted midpoint configuration has proven particularly advantageous in that it results in a relatively high out-of-plane stiffness and a relatively low in-plane stiffness, while minimizing the position-dependent stiffness variations that plague many conventional suspension designs. As stated above, the midpoint configuration provides substantially equivalent stiffness of the assembly along the X and Y axes. However, depending on the application, it may be equally desirable to location the suspension assemblies at the corners of mover 420, or at other suitable locations.

A further advantage of the system shown in FIG. 6B arises from the independence of the suspension sub-assemblies from one another. In particular, the fact that the coupling members of device 410 are not rigidly connected to one another can simplify the design of sensors that monitor the relative displacement of mover 420. It will be appreciated from the foregoing discussion that coupling members on the left and right suspension sub-assemblies move with, or track, mover 420 when the mover moves in the X direction. For relative Y-axis motion, by contrast, those coupling members are substantially independent of mover 420. In other words, those coupling members do not track the mover when its displacement varies along the Y axis. The opposite is true of the coupling members associated with the suspension sub-assemblies on the top and bottom side edges of mover 420. Those coupling members track Y-axis motion of mover 420, and are substantially independent of X-axis motion. Where position sensors are mounted to the various coupling members, the single-axis tracking feature just described can greatly simplify the design of the position sensing system. Many conventional suspension designs use a single intermediate frame member, such that the intermediate frame member tracks the mover in either the X or Y directions, but not both. The position sensor simplifications discussed above cannot be implemented in such a conventional system.

Figures 7A, 7B:
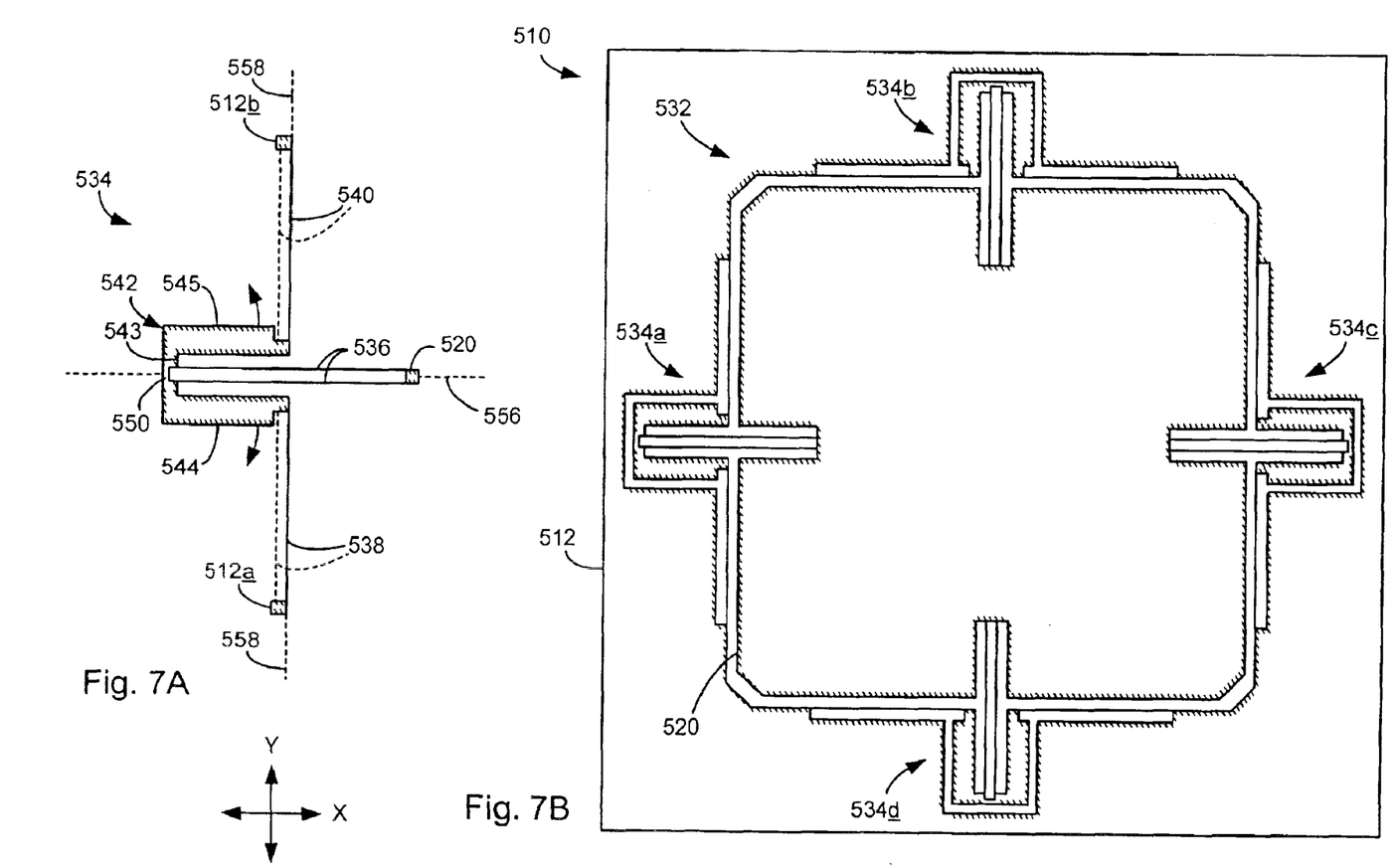
FIG. 7A is a plan view of another mechanical suspension unit that may be employed with movable systems.
FIG. 7B is a plan view of a movable system, including a plurality of suspension units such as that shown in 7A, according to another embodiment of the present invention.

FIGS. 7A and 7B respectively depict a mechanical suspension sub-assembly and a movable system (e.g., a MEMS computer storage device) incorporating a plurality of suspension sub-assemblies similar to that shown in FIG. 7A. Referring first to FIG. 7A, suspension sub-assembly 534 includes flexures 536, 538, and 540 arranged about a coupling member 542. Mover flexures 536 typically are connected between coupling member 542 and the mover (shown partially at 520). Typically, as indicated, there are two mover flexures 536 arranged parallel to and adjacent one another, though one mover flexure or more than two mover flexures may be employed.

Similar to the suspension sub-assemblies described with reference to FIGS. 6A and 6B, frame flexures 538 and 540 may be symmetrically disposed on opposing sides of mover flexures 536, and the frame flexures may be aligned along a common axis 558 that bisects the mover flexures 536. Frame flexure 538 is coupled between coupling member 542 and frame anchor point 512*a*, while frame flexure 540 is connected between the coupling member and frame anchor point 512*b*. As indicated, the suspension sub-assembly may include additional frame flexures 538 and 540, such that a pair of frame flexures extends from each side of coupling member 542 and is secured to the respective frame anchor point. In such a case, the frame flexure groups may be positioned so as to lie along or nearly along the bisecting axis 558. In some settings, the additional frame flexures will provide a desirable increase in the Z-axis stiffness of the mechanical suspension.

Coupling member 542 includes a central portion 543, to which mover flexures 536 may be attached, and two side portions 544 and 545. Side portions 544 and 545 typically are opposed and symmetrically arranged about central portion 543 such that coupling member 534 forms a "U-shaped" structure. Alternatively, coupling member 534 may be trapezoidal, square or rectangular in shape, or formed with any other desired shape and/or dimensions.

Coupling member 542 further includes a compensation link 550, configured to substantially reduce non-linearity (via length change compensation) in the stiffness of suspension unit 534 during mover displacement. Compensation link 550 is located adjacent one end of mover flexures 536, and typically is bisected by centerline 556. Link 550 may be formed as a region of diminished thickness, relative to adjacent portions 544 and 545, and the thickness may vary depending upon the desired application. Regardless of thickness, as frame flexures 538 and 540 deform (due to movement of mover 520 in the X direction), axial tensioning in flexures 538 and 540 pulls open coupling member 542, as indicated by the depicted arrows. This provides a length-change compensating effect by increasing the effective length of flexures 538 and 540. This lessens the in-plane stiffness variation that would otherwise occur with increased X-axis displacement of mover 520 away from its resting position. The compensating effect aids in maintaining a high ratio between the out-of-plane stiffness and the in-plane stiffness of the system. As discussed above, it is typically desirable to maintain this ratio at a high level with minimal variation over the operative range of motion. Any or all of the embodiments of the present invention may be provided with coupling members having this compensation feature.

As indicated, the thickness of the compensation link may vary, relative to adjacent portions 544 and 545 of the coupling member. A relatively thin compensation link will often produce a desirable increase in the in-plane softness of the suspension unit. However, in some cases it will be desirable to have a relatively thick compensation link, in order to provide increased out-of-plane stiffness.

Referring now to FIG. 7B, a MEMS device 510 is depicted, including a mechanical suspension 532 having a plurality of suspension sub-assemblies 534*a*–*d* that are similar to the sub-assembly depicted in FIG. 7A. The suspension sub-assemblies movably interconnect frame 512 and mover 520, so as to allow planar X-Y motion of the mover while substantially inhibiting out-of-plane movement (Z-axis motion). As with the embodiment described with reference to FIG. 6B, the sub-assemblies may be arranged as indicated in a symmetrical fashion about mover 520, with each sub-assembly being located at a midpoint of one of the mover side edges. Alternatively, the sub-assemblies may be positioned at the corners of the mover or in any other suitable location. In addition to the compensation effect described with reference to FIG. 7A, the depicted system has stiffness-related advantages similar to those described with reference to the system shown in FIG. 6B. Also similar to the system of FIG. 6B, the coupling members used in the depicted suspension are independent of one another and may be configured for single-axis tracking in order to simplify sensor design.

Figure 8A:
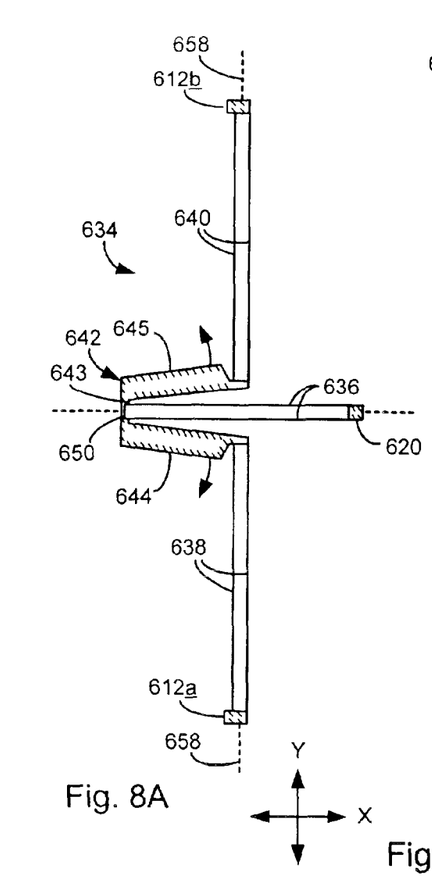
FIG. 8A is a plan view of yet another mechanical suspension unit that may be employed with movable systems.
Figure 8B:
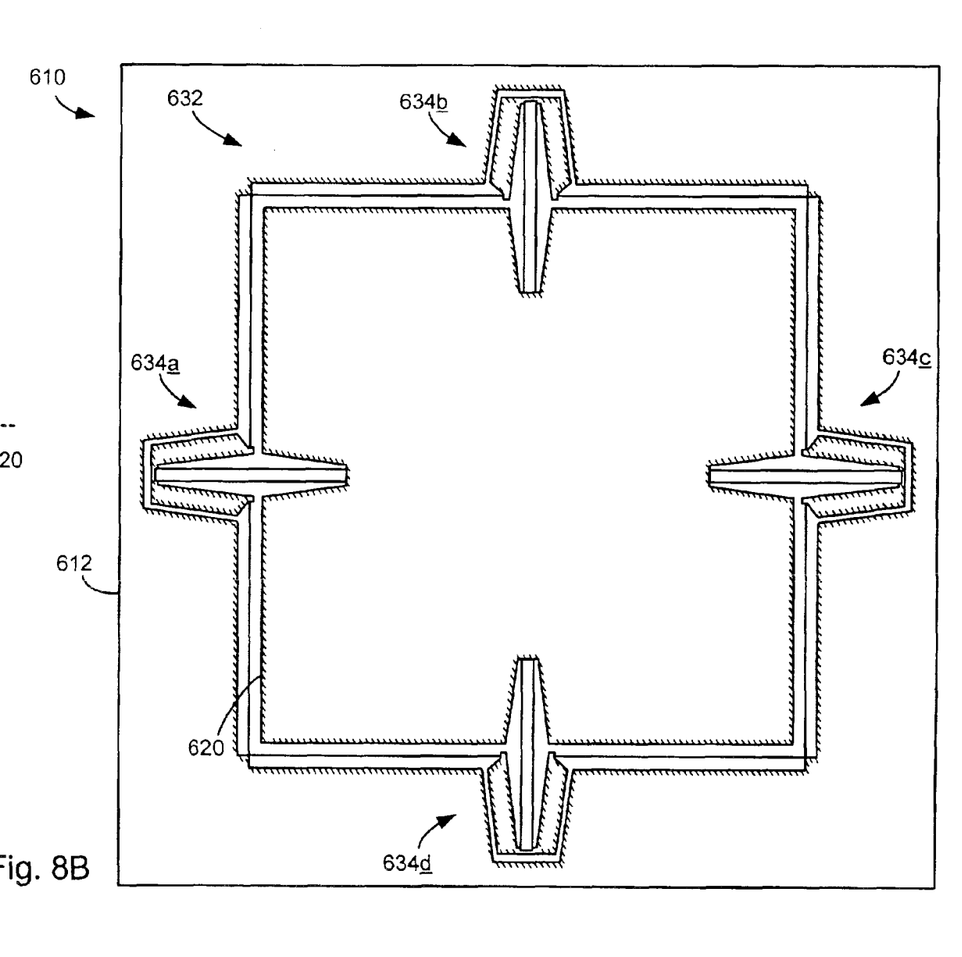
FIG. 8B is a plan view of a movable system, including a plurality of suspension units such as that shown in 8A, according to yet another embodiment of the present invention.

FIGS. 8A and 8B respectively depict a suspension sub-assembly and movable MEMS device according to further embodiments of the present invention. Referring first to FIG. 8A, suspension sub-assembly 634 includes mover flexures 636, and frame flexures 638 and 640, with an interposed coupling member 642 that is trapezoidal in shape. Suspension assembly 634 may be provided with pairs of frame flexures 638 and 640, as indicated in FIG. 8A and previously discussed with reference to the embodiment of FIG. 7A. Flexures 638 are connected to the frame at frame anchor point 612a, while flexures 640 are connected to the frame at frame anchor point 612b. As indicated, flexures 638 and 640 may be aligned along an axis 658 that passes through mover flexures 636 at or near the midpoint of the mover flexures.

Trapezoidal coupling member 642 typically includes a central portion 643 and two flanking side portions 644 and 645 that extend angularly from portion 643. Similar to the coupling member shown in FIG. 7A, coupling member 642 may include a compensation link 650 to provide length change compensation upon axial tensioning of frame flexures 638 and 640. As best seen in FIG. 8B, the frame flexures of suspension sub-assembly 634 typically are longer than the frame flexures shown in FIGS. 7A and 7B, such that the frame flexures extend all the way to the corners of the depicted mover. Any of the embodiments described herein may be configured with frame flexures of similar length, or with frame flexures of any other suitable length, as desired for a given application. Length of the mover flexures for the suspension sub-assemblies described herein may also be varied as desired for a given application.

As with the embodiments of FIGS. 6B and 7B, MEMS device 610 (FIG. 8B) includes a mechanical suspension 632 that may be configured with four suspension sub-assemblies 634a–d. The sub-assemblies movably couple frame 612 and mover 620. As depicted, the sub-assemblies may be symmetrically arranged about the four sides of mover 620, so that the individual sub-assemblies are centered at the midpoints of the sides of the mover. Alternatively, as with the previous embodiments, the sub-assemblies may be positioned at the corners of the mover, or at any other suitable location. The sub-assemblies of FIG. 8B are shown in an alternate configuration from the sub-assembly of FIG. 8A, in that they have only one frame flexure extending from each side of the sub-assembly coupling member. It will be appreciated that one flexure, a pair of flexures, or more than two frame flexures may be used on each side of the coupling member, as appropriate for a given application.

Figure 9:
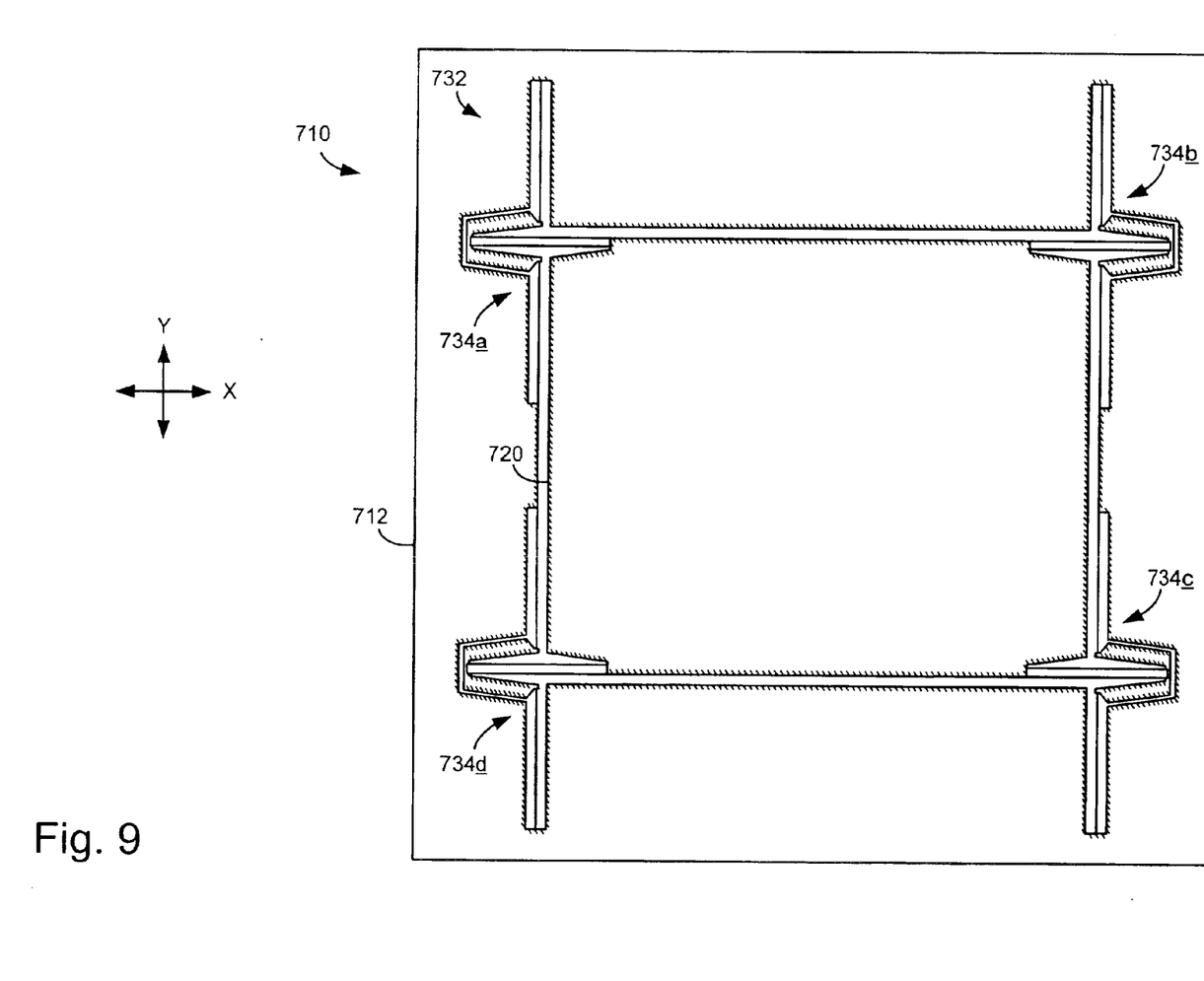
FIG. 9 is a plan view of a movable system, according to yet another embodiment of the present invention.

FIG. 9 depicts an exemplary MEMS device 710, in which suspension units 734a-d of suspension 732 are coupled between the frame 712 and mover 720, such that the individual suspension units are located at the corners of mover 720. According to this embodiment, the mover flexures resiliently deform in response to mover displacement along the X axis, while the frame flexures deform in response to mover displacement along the Y axis. Assuming flexure beams of identical construction, the depicted configuration of suspension units may provide differing X-and Y-axis stiffness, which may be desirable for certain applications.

In many of the embodiments described above, frame flexures are provided on opposing sides of a mover flexure or flexures so that the frame flexures are aligned along an axis that bisects the mover flexure(s). As described above, this provides stiffness characteristics that are desirable in many settings. It should be appreciated, however, that the relative position of the flexures may be varied while retaining the advantages described above. For example, the frame flexures may be positioned so that they are shifted to one side of the bisecting axis, while still maintaining the frame flexures aligned along a line that passes through the mover flexure(s).

Several advantages are provided by the foregoing embodiments of the present invention. One advantage is the large stiffness ratio (out-of-plane to in-plane stiffness) achieved for the present suspension assemblies, relative to prior systems. This is due largely to flexure design and deployment. For a single flexure, the beam aspect ratio (AR, where AR=beam height/beam width), can be approximately related to its bending stiffness ratio, $k_z/k_x=AR^2$, where $k_z$ is the spring constant for Z-axis stiffness and $k_x$ is the spring constant for X-axis stiffness. For a suspension with two degrees of freedom (movement in the X and Y directions), the maximum theoretical stiffness ratio is $k_z/k_{xy}=AR^2$, where $k_x=k_y=k_{xy}$. This equation assumes pure bending of all flexures with no subsequent deformation of the frame, mover, or connecting structures. Many prior flexural configurations fall far short of the theoretical maximum stiffness ratio. In contrast, testing has shown that certain suspension assemblies achieve greater than 75% of the maximum theoretical stiffness ratio. In addition, the above-described embodiments minimize cross-axis interactions, and/or losses in out-of-plane stiffness that result during in-plane mover displacement.

While the invention has been particularly shown and described with reference to the foregoing embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

What is claimed is:

1. A computer storage device, comprising:
   a frame;
   a mover configured to move relative to the frame, the mover including a plurality of data locations accessible via operation of a read/write device; and
   a mechanical suspension operatively coupled between the frame and mover, the mechanical suspension being configured to permit planar movement of the mover relative to the frame while substantially, preventing out-of-plane relative movement, such planar movement being defined by an X direction and a Y direction, the mechanical suspension including:
   at least one X-axis flexure configured to flex in response to movement of the mover in the X direction relative to the frame;
   two Y-axis flexures configured to flex in response to movement of the mover in the Y direction relative to the frame, the Y-axis flexures being symmetrically disposed on opposing sides of the X-axis flexure and aligned along a longitudinal axis that bisects the X-axis flexure: and
   a coupling member arranged between and secured to the X-axis flexure and the Y-axis flexures.

2. The device of claim 1, where the coupling member is configured to track relative movement of the mover in the X direction while remaining substantially independent of relative movement of the mover in the Y direction.

3. The device of claim 2, where the X-axis flexure is one of a plurality of X-axis flexures that are secured between the mover and the coupling member.

4. The device of claim 1, where the Y-axis flexures are secured between the coupling member and frame, and where the coupling member includes a compensation link configured to provide length change compensation upon axial tensioning of the Y-axis flexures.

5. The device of claim 4, where the X-axis flexure is aligned so that it is substantially parallel to and co-axial with an axis that passes through the compensation link.

6. The device of claim 5, where the X-axis flexure is one of a plurality of X-axis flexures arranged parallel to one another, each X-axis flexure having a first end secured to the mover and a second end secured to the coupling member near the compensation link.

7. A computer storage device, comprising:
   a frame;
   a mover configured to move relative to the frame, the mover including a plurality of data locations accessible via operation of a read/write device; and
   a mechanical suspension operatively coupled between the frame and mover, the mechanical suspension being configured to permit planar movement at the mover relative to the frame while substantially preventing out-of-plane relative movement, such planer movement being defined by an X direction and a Y direction, the mechanical suspension including;
   at least one X-axis flexure configured to flex in response to movement of the mover in the X direction relative to the frame; and
      two Y-axis flexures configured to flex in response to movement of the mover in the Y direction relative to the frame, the Y-axis flexures being symmetrically disposed on opposing sides of the X-axis flexure and aligned along a longitudinal axis that bisects the X-axis flexure,
      where a double-folded Y-axis flexure group is provided on each of the opposing sides of the X-axis flexure, the two Y-axis flexures being included in the Y-axis flexure groups, and where each double-folded Y-axis flexure group includes a floating link and is configured to provide length change compensating upon axial tensioning of the Y-axis flexures.

8. A computer storage device, comprising:
   a frame;
   a mover configured to move relative to the frame, the mover including a plurality of data locations accessible via operation of a read/write device; and
   a mechanical suspension operatively coupled between the frame and mover, the mechanical suspension being configured to permit planar movement of the mover relative to the frame while substantially preventing out-of-plane relative movement, such planar movement being defined by an X direction and a Y direction, the mechanical suspension including;
      at least one X-axis flexure configured to flex in response to movement of the mover in the X direction relative to the frame; and
      two Y-axis flexures configured to flex in response to movement of the mover in the Y direction relative to the frame, the Y-axis flexures being symmetrically disposed on opposing sides of the X-axis flexure and aligned along a longitudinal axis that bisects the X-axis flexure,
      where a double-folded Y-axis flexure group is provided on each of the opposing sides of the X-axis flexure, the two Y-axis flexures being included in the Y-axis flexure groups, where the mechanical suspension further includes a coupling member arranged between the double-folded Y-axis flexure groups and the axis flexure, such that the X-axis flexure is coupled between the mover and the coupling member, and such that each double-folded Y-axis flexure group is coupled between the frame and the coupling member.

9. A computer storage device, comprising:
   a frame;
   a mover configured to move relative to the frame, the move including a plurality of data locations accessible via operation of a read/write device; and
   a mechanical suspension operatively coupled between the frame and mover, the mechanical suspension being configured to permit planar movement of the mover relative to the frame while substantially preventing out-of-plane relative movement, such planar movement being defined by an X direction and a Y direction, the mechanical suspension including a plurality of suspension sub-assemblies operatively coupled between the mover and frame, each suspension sub-assembly including a coupling member, a frame flexure secured between the coupling member and frame, and a mover flexure secured between the coupling member and mover, and where the coupling members of the different suspension sub-assemblies are independent of one another,
   where at least one of the flexures of the suspension sub-assemblies is an X-axis flexure configured to flex in response to movement of the mover in the X direction relative to the frame, and where at least one of the flexures of the suspension sub-assemblies is a Y-axis flexure configured to flex in response to movement of the mover in the Y direction relative to the frame.

10. The device of claim 9, where the suspension sub-assemblies are arranged about the mover such that the mover flexure of each suspension sub-assembly is secured to the mover at a midpoint of an elongate side edge of the mover.

11. The device of claim 9, where the suspension sub-assemblies are arranged about the mover such that the mover flexure of each suspension sub-assembly is secured to the mover near a corner of the mover.

* * * * *

UNITED STATES PATENT AND TRADEMARK OFFICE
CERTIFICATE OF CORRECTION

PATENT NO. : 6,882,019 B2  
DATED : April 19, 2005  
INVENTOR(S) : Walmsley et al.

It is certified that error appears in the above-identified patent and that said Letters Patent is hereby corrected as shown below:

Column 5,  
Line 45, delete "below FIGS." and insert therefor -- below. --.  
Line 46, before "5A", insert -- FIGS. --.

Column 10,  
Line 46, delete "substantially," and insert therefor -- substantially --.

Column 12,  
Line 14, delete "axis" and insert therefor -- X-axis --.

Signed and Sealed this

Thirteenth Day of December, 2005

JON W. DUDAS  
*Director of the United States Patent and Trademark Office*

UNITED STATES PATENT AND TRADEMARK OFFICE
CERTIFICATE OF CORRECTION

PATENT NO. : 6,882,019 B2
APPLICATION NO. : 10/157254
DATED : April 19, 2005
INVENTOR(S) : Walmsley et al.

It is certified that error appears in the above-identified patent and that said Letters Patent is hereby corrected as shown below:

In the Claims

Col. 11 (line 22), delete "at" and insert therefor --of--.

Col. 12 (line 22), delete "move" and insert therefor --mover--.

Signed and Sealed this

Eleventh Day of September, 2007

JON W. DUDAS
*Director of the United States Patent and Trademark Office*